US012680573B2

(12) United States Patent
Futae et al.

(10) Patent No.: US 12,680,573 B2
(45) Date of Patent: Jul. 14, 2026

(54) GAS BEARING DEVICE

(71) Applicant: MITSUBISHI HEAVY INDUSTRIES ENGINE & TURBOCHARGER, LTD., Sagamihara (JP)

(72) Inventors: Takaya Futae, Tokyo (JP); Hideaki Nishida, Tokyo (JP); Shuichi Isayama, Tokyo (JP); Naomichi Shibata, Sagamihara (JP); Shingo Tanaka, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 39 days.

(21) Appl. No.: 18/839,148

(22) PCT Filed: Feb. 22, 2022

(86) PCT No.: PCT/JP2022/007326
§ 371 (c)(1),
(2) Date: Aug. 16, 2024

(87) PCT Pub. No.: WO2023/162025
PCT Pub. Date: Aug. 31, 2023

(65) Prior Publication Data
US 2025/0163956 A1      May 22, 2025

(51) Int. Cl.
*F16C 17/02* (2006.01)

(52) U.S. Cl.
CPC .................................. *F16C 17/024* (2013.01)

(58) Field of Classification Search
CPC ............................. F16C 17/024; F16C 17/042
See application file for complete search history.

(56) References Cited

U.S. PATENT DOCUMENTS

| | | | |
|---|---|---|---|
| 4,795,274 | A | 1/1989 | Gu |
| 2005/0163407 | A1 | 7/2005 | Kang et al. |

(Continued)

FOREIGN PATENT DOCUMENTS

| | | |
|---|---|---|
| CN | 211820378 U | 10/2020 |
| CN | 211874934 U | 11/2020 |

(Continued)

OTHER PUBLICATIONS

International Preliminary Report on Patentability and Written Opinion of the International Searching Authority for International Application No. PCT/JP2022/007326, dated Sep. 6, 2024, with an English translation.

(Continued)

*Primary Examiner* — Alan B Waits
(74) *Attorney, Agent, or Firm* — Birch, Stewart, Kolasch & Birch, LLP

(57) ABSTRACT

A gas bearing device according to one aspect of the present disclosure comprises: a housing which has therein a housing space that houses a rotary shaft and in which a groove portion extending along the axial direction of the rotary shaft is formed in an inner peripheral surface that defines the housing space; a top foil which is provided in an annular gap formed between the inner peripheral surface and the rotary shaft and which has one end portion in the circumferential direction of the rotary shaft inserted in the groove portion; and a backup foil which is provided in the annular gap on the outer side of the top foil so as to surround the top foil, which is configured to elastically support the top foil, and which has one end portion in the circumferential direction of the rotary shaft inserted in the groove portion such that the one end portion is positioned on one side in the groove portion with respect to the one end portion of the top foil. The groove portion includes a pair of side wall surfaces which (Continued)

are disposed so as to face each other and which include one side wall surface positioned on the one side in the groove portion and the other side wall surface positioned on the other side in the groove portion. The gas bearing device further comprises a pressing force application means disposed in the groove portion and configured to press each of the one end portions of the top foil and the backup foil against the other side wall surface.

5 Claims, 6 Drawing Sheets

(56) References Cited

U.S. PATENT DOCUMENTS

| | | | | |
|---|---|---|---|---|
| 2007/0047858 | A1* | 3/2007 | Hurley | F16C 17/024 |
| | | | | 384/106 |
| 2011/0171020 | A1* | 7/2011 | Spathias | F04D 29/056 |
| | | | | 384/103 |
| 2015/0292552 | A1* | 10/2015 | Thompson | F16C 17/024 |
| | | | | 384/103 |

| | | | | |
|---|---|---|---|---|
| 2021/0372465 | A1 | 12/2021 | Omori | |
| 2022/0065288 | A1 | 3/2022 | Schweizer et al. | |
| 2022/0099102 | A1* | 3/2022 | Okano | F04D 29/046 |

FOREIGN PATENT DOCUMENTS

| | | |
|---|---|---|
| DE | 10 2018 132 678 A1 | 6/2020 |
| JP | 2002-364643 A | 12/2002 |
| JP | 2009-264567 A | 11/2009 |
| SD | 709857 A1 | 1/1980 |
| SU | 709857 A1 | 1/1980 |
| WO | WO 2020/099226 A1 | 5/2020 |
| WO | WO 2020/171021 A1 | 8/2020 |

OTHER PUBLICATIONS

International Search Report and Written Opinion of the International Searching Authority for International Application No. PCT/JP2022/007326, dated Apr. 26, 2022, with English translation.
German Office Action for German Application No. 11 2022 006 039.5, dated Dec. 15, 2025, with English translation.

* cited by examiner

CROSS SECTION TAKEN ALONG LINE A-A

GAS BEARING DEVICE

TECHNICAL FIELD

The present disclosure relates to a gas bearing device.

BACKGROUND ART

In some cases, a rotary machine such as an electric compressor adopts a gas bearing, which is a type of oil-less bearing, to avoid contamination of compressed air which is caused by mixing of a lubricant with the compressed air. The gas bearing has lower bearing load capacity than an oil bearing to support a rotary shaft by forming a gas film between the rotary shaft and a bearing surface. Therefore, a gas film pressure needs to be generated as efficiently as possible between the rotary shaft and the bearing. Therefore, the bearing surface is formed of a thin plate (top foil) deformable to follow the gas film pressure, and a back surface of the top foil is elastically supported by a plate-shaped backup foil. In addition, a fixing component such as a snap ring is used to fix positions of the top foil and the backup foil in an axial direction of the rotary shaft. However, in this case, there is a problem in that assembly workability deteriorates.

Each of PTL 1 and 2 discloses a gas bearing. In the gas bearing disclosed in PTL 1, as a method for fixing positions of the top foil and the backup foil in the axial direction of the rotary shaft, the following method is adopted. One end portions of the top foil and the backup foil are inserted into a groove portion formed on an inner surface of a housing surrounding the rotary shaft, and thereafter, a spacer is press-fitted into the groove portion. In the gas bearing disclosed in PTL 2, a method is adopted in which end portions of the top foil and the backup foil are press-fitted into the groove portion formed on an inner surface of the housing surrounding the rotary shaft.

CITATION LIST

Patent Literature

[PTL 1] Japanese Unexamined Patent Application Publication No. 2002-364643
[PTL 2] Japanese Unexamined Patent Application Publication No. 2009-264567

SUMMARY OF INVENTION

Technical Problem

However, fixing means disclosed in PTL 1 needs to accurately finish dimensions of the groove portion and the spacer in accordance with plate thickness dimensions of the top foil and the backup foil, thereby causing a problem in that working thereof is troublesome. In addition, a fixing method disclosed in PTL 2 also needs to accurately finish the dimension of the groove portion formed in the housing in accordance with the plate thickness dimension of the foil member, thereby causing a problem in that working of the groove portion is troublesome.

The present invention is made in view of the above-described circumstances, and an object of the present invention is to reliably fix a foil member forming a gas bearing to a housing by simple means.

Solution to Problem

According to an aspect of the present disclosure, in order to achieve the above-described object, there is provided a gas bearing device including a housing internally having an accommodation space for accommodating a rotary shaft, a groove portion extending along an axial direction of the rotary shaft being formed on an inner peripheral surface defining the accommodation space in the housing, a top foil provided in an annular gap formed between the inner peripheral surface and the rotary shaft, one end portion in a circumferential direction of the rotary shaft being inserted into the groove portion, and a backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil. The groove portion includes a pair of side wall surfaces disposed to face each other, the pair of side wall surfaces including one side wall surface located on the one side in the groove portion, and the other side wall surface located on the other side in the groove portion. The gas bearing device further comprises pressing force application means disposed in the groove portion, and configured to press the one end portion of each of the top foil and the backup foil against the other side wall surface.

According to another aspect of the present disclosure, there is provided a gas bearing device including a housing internally having an accommodation space for accommodating a rotary shaft, a groove portion extending along an axial direction of the rotary shaft being formed on an inner peripheral surface defining the accommodation space in the housing, a top foil provided in an annular gap formed between the inner peripheral surface and the rotary shaft, one end portion in a circumferential direction of the rotary shaft being inserted into the groove portion, and a backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil. The groove portion includes a corrugated groove portion extending in a corrugated shape along the axial direction.

According to still another aspect of the present disclosure, there is provided a gas bearing device including a housing internally having an accommodation space for accommodating a rotary shaft, a groove portion extending along an axial direction of the rotary shaft being formed on an inner peripheral surface defining the accommodation space in the housing, a top foil provided in an annular gap formed between the inner peripheral surface and the rotary shaft, one end portion in a circumferential direction of the rotary shaft being inserted into the groove portion, and a plate-shaped backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil. The groove portion includes an inclined groove portion in which a distance from a center line of the rotary shaft decreases from one side toward the other side in the axial direction. The one end portion of each of the top foil and the backup foil includes the inclined groove portion in which the distance from the center line of the rotary shaft decreases from one side toward the other side in the axial direction, and is disposed in the inclined groove portion such that a tip of at least a portion of the inclined portion abuts on a bottom surface of the inclined groove portion.

Advantageous Effects of Invention

According to one aspect of the gas bearing device of the present disclosure, a frictional force can increase between a wall surface forming the groove portion formed on the inner peripheral surface of the housing provided around the rotary shaft and the one end portion of each of the top foil and the backup foil which are inserted into the groove portion. In this manner, movements of the top foil and the backup foil in the axial direction can be prevented.

DESCRIPTION OF EMBODIMENTS

Figure 1:
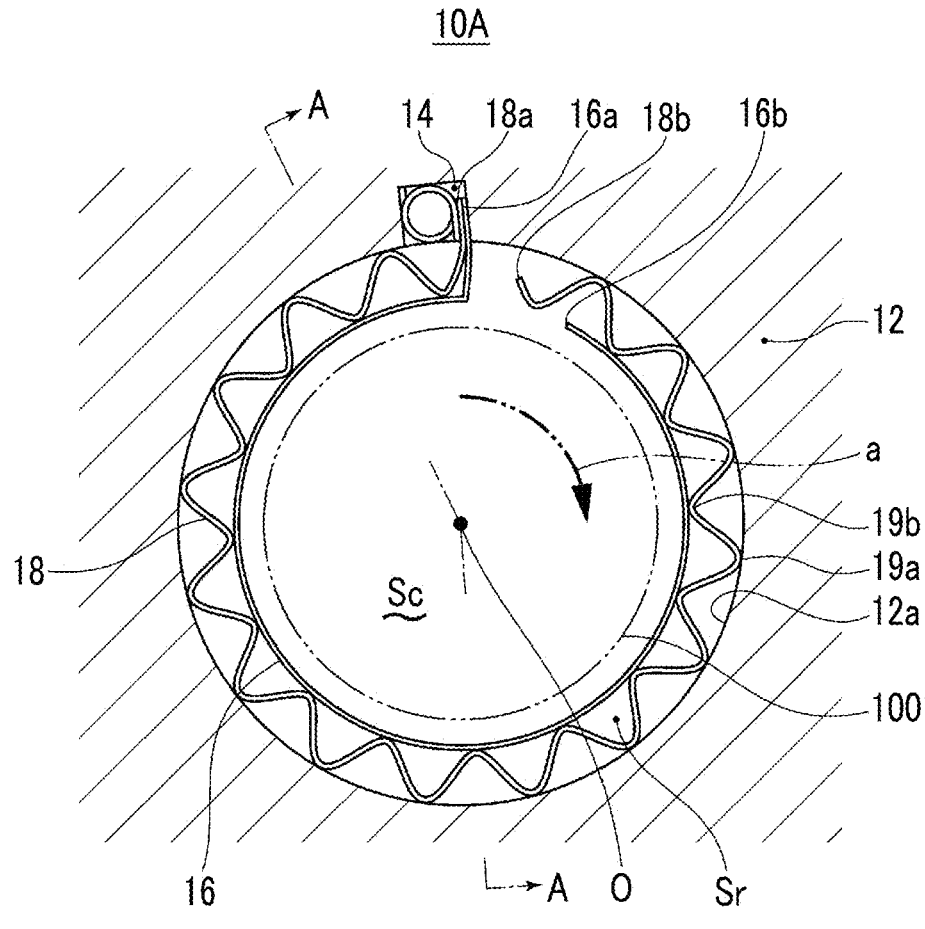
FIG. 1 is a front sectional view of a gas bearing device according to an embodiment.

Hereinafter, some embodiments of the present invention will be described with reference to the accompanying drawings. Dimensions, materials, shapes, and relative dispositions of components described in the embodiments or illustrated in the drawings are not intended to limit the scope of the present invention, and are merely examples for description.

For example, expressions representing relative or absolute dispositions such as "in a certain direction", "along a certain direction", "parallel", "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an undulating portion or a chamfered portion within a range where the same effect can be obtained.

Meanwhile, expressions "being provided with", "being equipped with", "including", or "having" one component are not exclusive expressions excluding the presence of other components.

Figure 2:
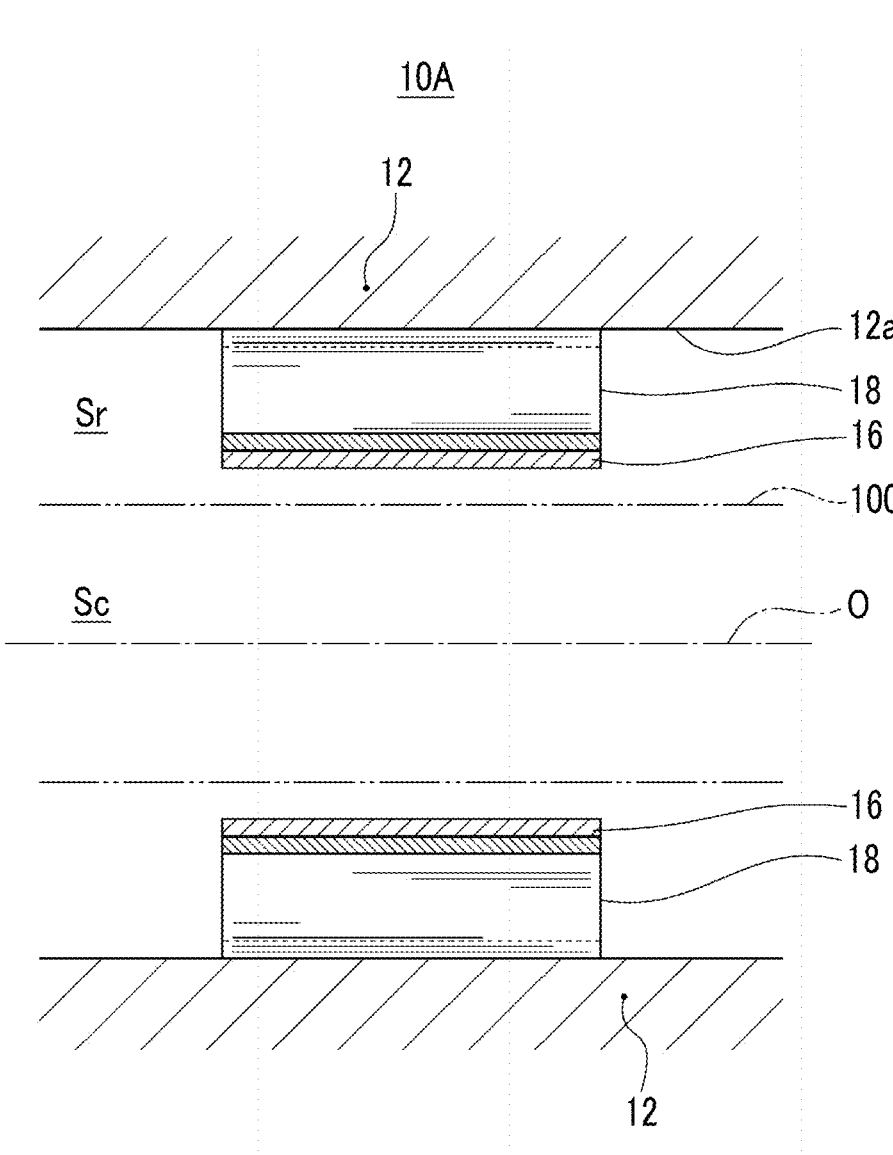
FIG. 2 is a side sectional view taken along line A-A in FIG. 1.
Figure 3:
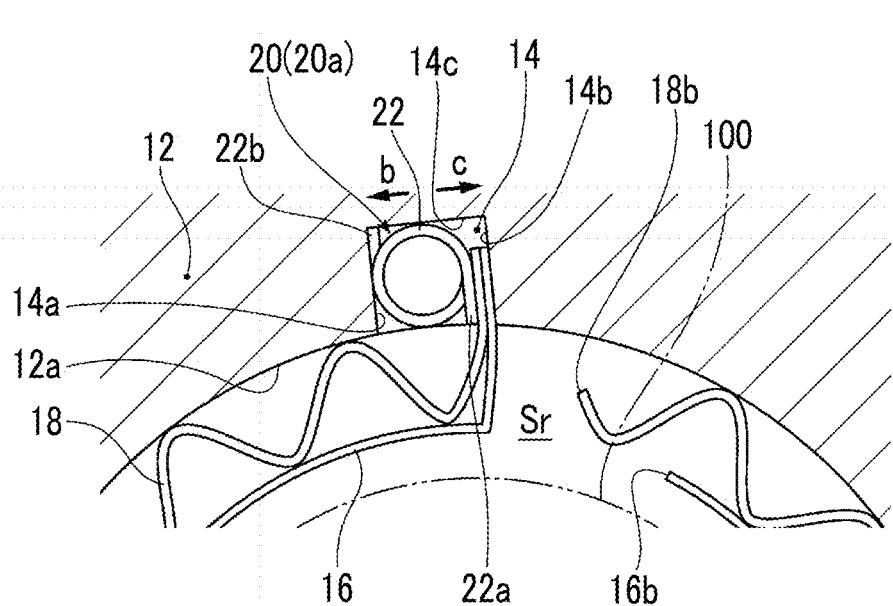
FIG. 3 is an enlarged front sectional view of a part in FIG. 1.
Figure 4:
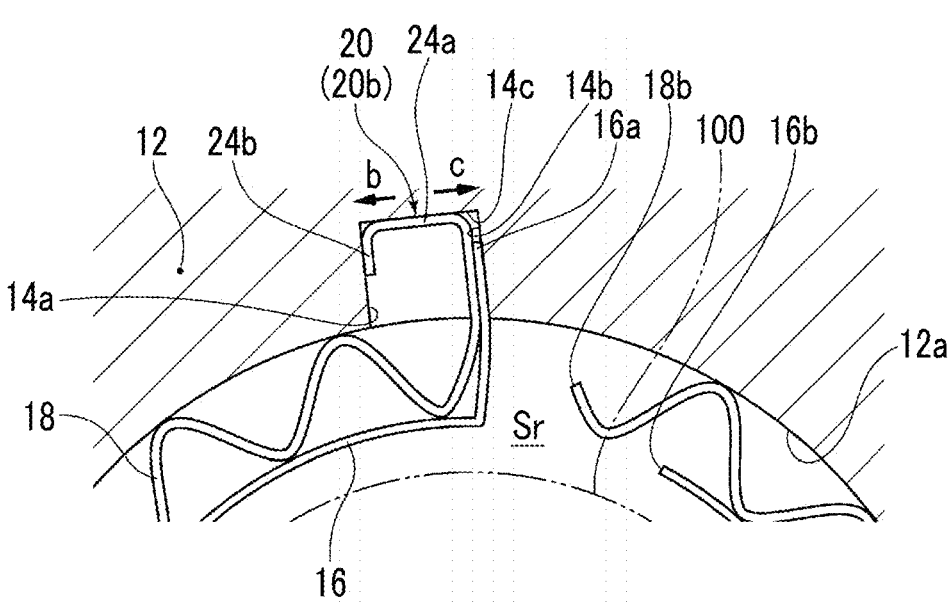
FIG. 4 is an enlarged front sectional view of a part of a gas bearing device according to another embodiment.

FIG. 1 is a front sectional view illustrating a gas bearing device 10A according to an embodiment, and FIG. 2 is a side sectional view taken along line A-A in FIG. 1. FIG. 3 is an enlarged front sectional view of a part in FIG. 1, and FIG. 4 is a front sectional view corresponding to FIG. 3 according to another embodiment of pressing force application means 20.

In FIGS. 1 and 2, the gas bearing device 10A includes a housing 12 internally having an accommodation space Sc for accommodating a rotary shaft 100. The rotary shaft 100 is a rotary shaft 100 provided in a rotary machine (for example, an electric compressor, a turbocharger, or the like), and rotates in a direction of an arrow a around a central axis O when accommodated in the accommodation space Sc. An inner peripheral surface 12a of the housing 12 is disposed to face an outer peripheral surface of the rotary shaft 100, and internally defines the accommodation space Sc. On the inner peripheral surface 12a, a groove portion 14 extending along an axial direction (hereinafter, simply referred to as an "axial direction") of the rotary shaft 100 is formed in a part of the rotary shaft 100 in a circumferential direction (hereinafter, simply referred to as a "circumferential direction").

In FIG. 1, the axial direction of the rotary shaft 100 is a direction orthogonal to a surface of the paper on which FIG. 1 is illustrated, and as illustrated in FIG. 2, the central axis O extends in the axial direction of the rotary shaft 100.

A top foil 16 and a backup foil 18 are provided in an annular gap Sr formed between the housing 12 and the rotary shaft 100 accommodated in the accommodation space Sc. The top foil 16 is formed in a thin plate shape, and is provided to surround the rotary shaft 100 in an inner region of the annular gap Sr. One end portion 16a of the top foil 16 in the circumferential direction of the rotary shaft 100 is inserted into the groove portion 14 extending along the axial direction.

The top foil 16 illustrated in FIG. 1 is formed in a cylindrical shape in accordance with a shape of the outer peripheral surface of the rotary shaft 100 having a circular cross section, and forms a smooth inner peripheral surface and an outer peripheral surface without any undulating portion.

The backup foil 18 is formed in a thin plate shape, and is provided on an outer side of the top foil 16 in a radial direction (hereinafter, simply referred to as a "radial direction") of the rotary shaft 100 in the annular gap Sr. That is, the backup foil 18 is provided to surround the top foil 16, and is configured to elastically support the top foil 16. As in the top foil 16, one end portion 18a in the circumferential direction is inserted into the groove portion 14.

The backup foil 18 illustrated in FIG. 1 is bent such that undulating portions are repeated along the circumferential direction of the rotary shaft 100. Each of the undulating portions extends along the axial direction, and is bent to advance and retreat in the radial direction of the rotary shaft 100 to form a valley. For example, the valleys are formed in a wave shape like a sine curve, but are not necessarily limited to an arc shape like the sine curve. For example, the valley may be the undulating portion having a rectangular shape, or may be the undulating portion like a parabola. A ridge portion 19a of the undulating portion formed in this way is in contact with a back surface of the top foil 16, and a valley portion 19b is in contact with the inner peripheral surface 12a of the housing 12 to elastically support the top foil 16.

Since the backup foil 18 has this undulating shape, the backup foil 18 can be deformed by receiving a pressure of a gas film formed between the rotary shaft 100 and the top foil 16. In this manner, the top foil 16 can be elastically supported. Therefore, the gas film is held between the rotary shaft 100 and the top foil 16, and the rotary shaft 100 is lubricated and supported by the gas film.

As illustrated in FIGS. 3 and 4, one end portion 16*a* of the top foil 16 in the circumferential direction and one end portion 18*a* of the backup foil 18 in the circumferential direction are inserted into the groove portion 14, and are fixed to the inside of the groove portion 14 by the pressing force application means 20 (to be described later). In this manner, the movements of the top foil 16 and the backup foil 18 in the axial direction are prevented.

In the embodiment illustrated in FIG. 1, the other end portion 16*b* of the top foil 16 and the other end portion 18*b* of the backup foil 18 on sides opposite to the one end portions 16*a* and 18*a* are free ends. Therefore, the top foil 16 and the backup foil 18 can be freely deformed by receiving a pressure of the gas film formed between the rotary shaft 100 and the top foil 16.

As illustrated in FIGS. 3 and 4, the groove portion 14 has a pair of side wall surfaces 14*a* and 14*b* disposed to face each other. The pair of side wall surfaces include one side wall surface 14*a* located on one side and the other side wall surface 14*b* located on the other side.

Here, the "one side" refers to a direction (direction of an arrow b) toward the one side wall surface 14*a* in FIGS. 3 and 4, and the "other side" refers to a direction (direction of an arrow c) toward the other side wall surface 14*b*.

That is, the "one side" refers to a side away from a side where the other end portions 16*b* and 18*b* of the top foil 16 and the backup foil 18, which are wound around a periphery of the rotary shaft 100 to substantially make one round from the groove portion 14, are present, and the "other side" refers to a side closer to the other end portions 16*b* and 18*b* than the "one side" is.

In the embodiment illustrated in FIG. 1, the rotary shaft 100 rotates in the direction of the arrow a. However, in FIGS. 3 and 4, the rotary shaft 100 rotates from one side toward the other side (in the direction of the arrow c).

Inside the groove portion 14, the one end portion 18*a* of the backup foil 18 is disposed on one side with respect to the one end portion 16*a* of the top foil 16, that is, on the side close to the one side wall surface 14*a*. In the embodiment illustrated in FIGS. 3 and 4, the one end portion 18*a* is disposed such that a mutually facing surface overlaps the one end portion 16*a* at a position where the one end portion 18*a* is close to the one side wall surface 14*a*.

As illustrated in FIGS. 3 and 4, the groove portion 14 is provided with the pressing force application means 20 that applies a pressing force to press the one end portions 16*a* and 18*a* toward the other side wall surface 14*b*.

According to the embodiment illustrated in FIGS. 3 and 4, the groove portion 14 includes the pressing force application means 20. Therefore, each of the one end portion 16*a* of the top foil 16 and the one end portion 18*a* of the backup foil 18 which are inserted into the groove portion 14 receives the pressing force from the pressing force application means 20, and is pressed against the other side wall surface 14*b*. In this manner, a frictional force acting between the one end portion 16*a* of the top foil 16 and the one end portion 18*a* of the backup foil 18 and a frictional force acting between the one end portion 16*a* of the top foil 16 and the other side wall surface 14*b* increase. Therefore, the one end portion 16*a* of the top foil 16 and the one end portion 18*a* of the backup foil 18 are stably fixed to the inside of the groove portion 14. Therefore, the movements of the top foil 16 and the backup foil 18 in the axial direction of the rotary shaft 100 can be prevented. In addition, in the present embodiment, unlike the fixing means disclosed in PTL 1 or 2, it is not necessary to carry out precise work for dimensions of a spacer or a groove portion in accordance with a plate thickness of the top foil or the backup foil.

In one embodiment, as illustrated in FIG. 3, the pressing force application means 20 includes a spring member 20*a* separately provided from the backup foil 18. The spring member 20*a* is inserted between the one side wall surface 14*a* and the one end portion 18*a* of the backup foil 18, and is disposed along an extending direction (axial direction) of the groove portion 14.

The spring member 20*a* applies the pressing force to the one end portion 18*a* of the backup foil 18, and also applies the pressing force to the one side wall surface 14*a*. The one side wall surface 14*a* to which the pressing force is applied from the spring member 20*a* applies a reaction force equivalent to the pressing force to the spring member 20*a*. In this manner, the frictional force generated between the one end portion 16*a* of the top foil 16 and the one end portion 18*a* of the backup foil 18 and the frictional force generated between the one end portion 16*a* of the top foil 16 and the other side wall surface 14*b* increase. Therefore, the one end portion 16*a* of the top foil 16 and the one end portion 18*a* of the backup foil 18 are stably fixed inside the groove portion 14. Therefore, the movements of the top foil 16 and the backup foil 18 in the axial direction of the rotary shaft 100 can be prevented by using simple means for disposing the spring member 20*a* in the groove portion 14.

Figures 5, 6:
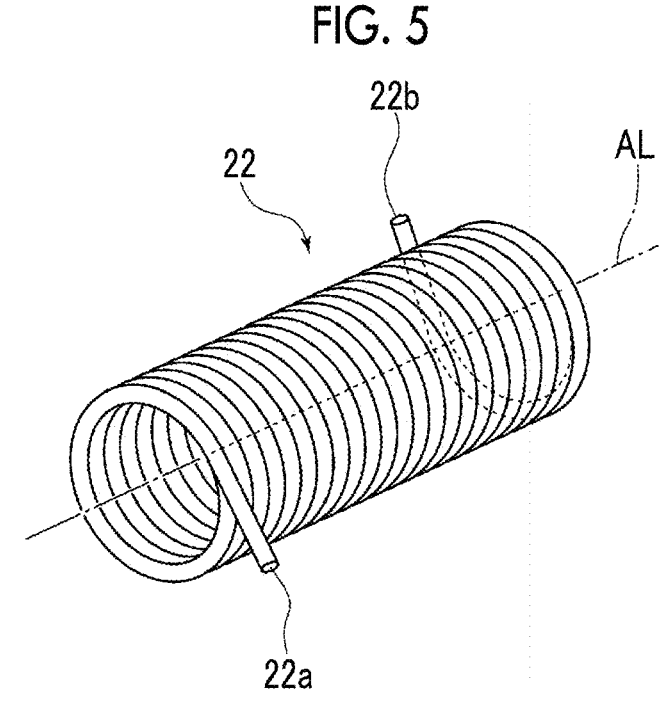
FIG. 5 is a perspective view illustrating a spring member according to the embodiment.
FIG. 6 is an enlarged front sectional view of a part of a gas bearing device including a spring member according to another embodiment.

In the embodiment illustrated in FIG. 3, the spring member 20*a* includes a torsion coil spring 22. FIG. 5 is a perspective view illustrating the torsion coil spring 22 according to the embodiment.

The torsion coil spring 22 illustrated in FIG. 5 is formed by bending one small-diameter rod member in a circular shape and forming the rod member in a coil shape, and is configured to extend along a direction of an axis AL. Both end portions of the rod member have linear portions 22*a* and 22*b* directed in a tangential direction from an outer peripheral surface of the coil, protruding outward of the outer peripheral surface, and extending in a linear shape. Since the linear portions 22*a* and 22*b* have this shape, when the linear portions 22*a* and 22*b* are inserted into the groove portion 14, the linear portions 22*a* and 22*b* are reliably press-welded to the one side wall surface 14*a* or the one end portion 18*a* of the backup foil 18.

As illustrated in FIG. 3, the torsion coil spring 22 is inserted between the one side wall surface 14*a* and the one end portion 18*a* of the backup foil 18. Inside the groove portion 14, a spring force is applied such that one of the linear portions 22*a* and 22*b* presses the one side wall surface 14*a* against one side (direction of the arrow b) and the other of the linear portions 22*a* and 22*b* presses the one end portion 18*a* of the backup foil 18 against the other side (direction of the arrow c).

According to the present embodiment, one of the linear portions 22*a* and 22*b* of the torsion coil spring 22 applies the pressing force to the one side wall surface 14*a*, and the other of the linear portions 22*a* and 22*b* applies the spring force for pressing the one end portion 18*a* of the backup foil 18 to the other side. Therefore, the one end portion 16*a* of the top foil 16 and the one end portion 18*a* of the backup foil 18 are pressed against the other side wall surface 14*b*. In this manner, the frictional force generated between the one end portion 16*a* of the top foil 16 and the one end portion 18*a* of the backup foil 18 and the frictional force generated between the one end portion 16*a* of the top foil 16 and the other side wall surface 14*b* increase. Therefore, the one end portion 16*a* of the top foil 16 and the one end portion 18*a* of the backup foil 18 are stably fixed to the inside of the groove portion 14. Therefore, the movements of the top foil 16 and the backup foil 18 in the axial direction can be prevented by using the simple means for disposing the torsion coil spring 22 in the groove portion 14.

FIG. 6 is an enlarged front sectional view of a part of the gas bearing device including the spring member 20a according to another embodiment.

In the embodiment, the spring member 20a includes a plurality of coil springs 26 inserted between the one side wall surface 14a and the one end portion 18a of the backup foil 18. Each of the coil springs 26 is inserted in a state of being compressed in the direction of the axis AL between the one side wall surface 14a and the one end portion 18a of the backup foil 18 in a state where the axis AL is directed in the circumferential direction. The plurality of coil springs 26 are disposed adjacent to each other to be parallel or at an interval in the extending direction (axial direction) of the groove portions 14.

In the present embodiment as well, the coil spring 26 applies the pressing force to the one side wall surface 14a and the one end portion 18a of the backup foil 18 along the direction of the axis AL. Therefore, the same operational effects as those of the above-described embodiment can be obtained.

In the embodiment illustrated in FIG. 4, the pressing force application means 20 includes an extending portion 20b formed integrally with the one end portion 18a of the backup foil 18. One end portion of the extending portion 20b is formed integrally with the one end portion 18a of the backup foil 18 inside the groove portion 14, and extends from the other side toward one side.

The extending portion 20b extends to the one side wall surface 14a, is in contact with the one side wall surface 14a, and is press-fitted into the groove portion 14 in a state where the spring force is applied to the one side wall surface 14a. When the extending portion 20b applies the pressing force to the one side wall surface 14a, a reaction force equivalent to the pressing force is received by a reaction from the one side wall surface 14a. The reaction force is transmitted to the one end portion 18a of the backup foil 18 via the extending portion 20b. Therefore, the one end portion 16a of the top foil 16 and the one end portion 18a of the backup foil 18 are pressed against the other side wall surface 14b. In this manner, the frictional force generated between the one end portion 16a of the top foil 16 and the one end portion 18a of the backup foil 18 and the frictional force generated between the one end portion 16a of the top foil 16 and the other side wall surface 14b increase. Therefore, the one end portion 16a of the top foil 16 and the one end portion 18a of the backup foil 18 are stably fixed to the inside of the groove portion 14. Therefore, the movements of the top foil 16 and the backup foil 18 in the axial direction can be prevented by using the simple means for providing the extending portion 20b in the groove portion 14.

In the embodiment illustrated in FIG. 4, the extending portion 20b includes a first extending portion 24a and a second extending portion 24b. In the first extending portion 24a, one end is formed integrally with the one end portion 18a of the backup foil 18, and extends from the one end portion 18a of the backup foil 18 toward the one side wall surface 14a, and the other end is configured to reach the one side wall surface 14a. The second extending portion 24b is formed integrally with the other end of the first extending portion 24a, and extends toward the rotary shaft 100 side while being in contact with the one side wall surface 14a.

In the present embodiment, almost the entire surface of one side surface of the second extending portion 24b is disposed to be in contact with the one side wall surface 14a. Therefore, a contact area with the one side wall surface 14a can be sufficiently ensured. Therefore, the pressing force of the extending portion 20b can be reliably applied to the one side wall surface 14a, and the reaction force received from the one side wall surface 14a can be reliably transmitted to the one end portion 16a of the top foil 16 via the one end portion 18a of the backup foil 18. Therefore, the frictional force generated between the one end portion 16a of the top foil 16 and the one end portion 18a of the backup foil 18 and the frictional force generated between the one end portion 16a of the top foil 16 and the other side wall surface 14b can reliably increase. In this manner, the movements of the top foil 16 and the backup foil 18 in the axial direction can be reliably prevented.

The first extending portion 24a and the second extending portion 24b may be provided in an entire region in the axial direction of the one end portion 18a extending along the axial direction, or may be only partially provided in the axial direction with respect to the one end portion 18a extending along the axial direction. In the latter case, the first extending portion 24a and the second extending portion 24b may be provided in a comb-tooth shape.

According to some embodiments illustrated in FIGS. 3 to 6, the one end portion 16a of the top foil 16 is in direct contact with the other side wall surface 14b, and a load is received from the spring member 20a or the extending portion 20b via the one end portion 18a of the backup foil 18. Therefore, a position of the one end portion 16a of the top foil 16 inside the groove portion 14 can be accurately held at a predetermined position without being affected by deformation of the spring member 20a or the extending portion 20b.

In addition, in the embodiments, the rotary shaft 100 rotates from one side to the other side. Therefore, a rotational force of the rotary shaft 100 is biased to the one end portion 16a of the top foil 16, and the one end portion 16a is pressed against the other side wall surface 14b. In this manner, the frictional force between the one end portion 16a of the top foil 16 and the other side wall surface 14b increases, and the top foil 16 can be more stably fixed to the inside of the groove portion 14.

The groove portion 14 illustrated in FIGS. 3 and 4 is formed in a rectangular shape in a cross section, and the pair of side wall surfaces 14a and 14b are formed as flat surfaces, and are formed parallel to each other. In a case of this shape, the pressing force applied the one side wall surface 14a by the spring member 20a or the extending portion 20b and the reaction force applied from the one side wall surface 14a to the spring member 20a or the extending portion 20b are generated substantially perpendicularly to the side wall surfaces 14a and 14b. Therefore, the pressing force and the reaction force are efficiently transmitted. However, the pair of side wall surfaces 14a and 14b do not need to be parallel to each other. That is, the side wall surfaces 14a and 14b may be inclined with respect to each other within a limit in which the pressing force of the spring member 20a or the extending portion 20b and the reaction force of the one side wall surface 14a are effectively transmitted to the other side wall surface 14b.

In addition, in the embodiment illustrated in FIGS. 3 and 4, a bottom surface 14c of the groove portion 14 has a flat surface. However, the bottom surface 14c does not necessarily need to have a flat surface. In addition, the groove portion 14 has a substantially square shape in a cross section.

However, the shape is not limited to a square, and for example, may be a rectangular shape or other shapes.

In one embodiment, the other side wall surface 14b has a surface roughness in which an arithmetic average roughness Ra is 3 to 50 μm (preferably, 5 to 30 μm).

According to the present embodiment, the surface roughness of the other side wall surface 14b has the arithmetic average roughness Ra of 3 μm to 50 μm. Therefore, the frictional force generated between the other side wall surface 14b and the one end portion 16a of the top foil 16 pressed against the other side wall surface 14b can further increase. Therefore, the movement of the top foil 16 in the axial direction can be more reliably prevented.

Figure 7:
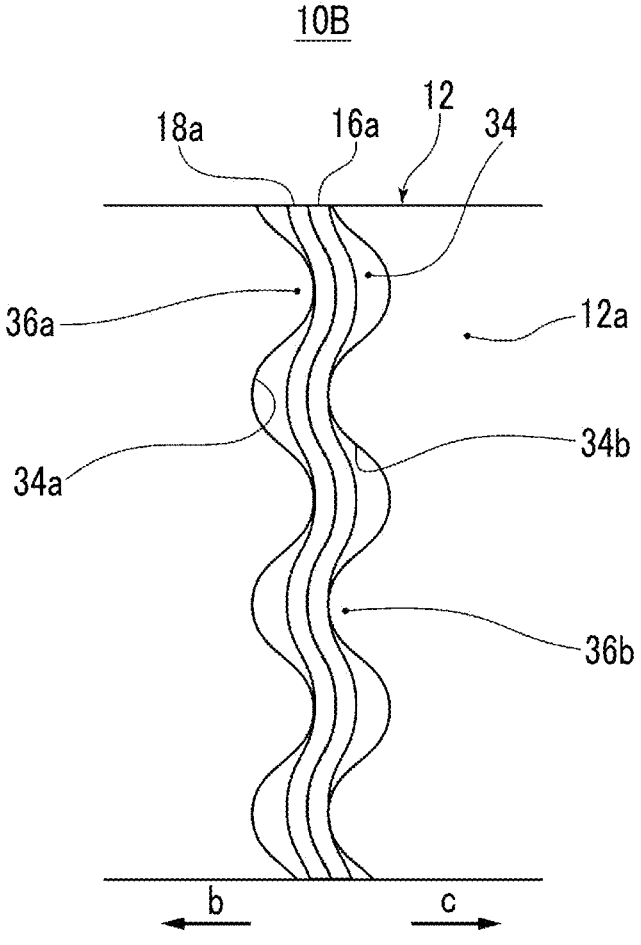
FIG. 7 is a front view illustrating an inner peripheral surface of a housing of a gas bearing device according to still another embodiment.

FIG. 7 is a front view illustrating a gas bearing device 10B according to another embodiment and illustrating the inner peripheral surface 12a of the housing 12.

As in the embodiment illustrated in FIGS. 1 to 6, in the present embodiment, the housing 12 is provided around the rotary shaft 100, and the annular gap Sr (not illustrated) is formed between the rotary shaft 100 and the housing 12. A corrugated groove portion 34 extending along the axial direction of the rotary shaft 100 is formed on the inner peripheral surface 12a of the housing 12. The corrugated groove portion 34 includes the corrugated groove portion 34 having a shape different from that of the groove portion 14 according to the embodiment illustrated in FIGS. 1 to 6. The top foil 16 is provided in the annular gap Sr to surround the rotary shaft 100, and the one end portion 16a of the top foil 16 in the circumferential direction of the rotary shaft 100 is inserted into the corrugated groove portion 34. The backup foil 18 is provided on an outer side of the top foil 16 in the radial direction to surround the top foil 16, and the backup foil 18 elastically supports the top foil 16. The one end portion 18a of the backup foil 18 in the circumferential direction is inserted into the corrugated groove portion 34.

In FIG. 7, configurations other than the configuration of the inner peripheral surface 12a of the housing 12 in which the corrugated groove portion 34 is formed are omitted.

The corrugated groove portion 34 includes the pair of side wall surfaces 34a and 34b disposed to face each other. The one side wall surface 34a is located on one side (side in the direction of the arrow b) of the corrugated groove portion 34, and the other side wall surface 34b is located on the other side (side in the direction of the arrow c) of the corrugated groove portion 34. The pair of side wall surfaces 34a and 34b forming the corrugated groove portion 34 have a corrugated shape in which the undulating portions are repeated along the axial direction. That is, on the side wall surfaces 34a and 34b, the undulating portions are periodically repeated along the axial direction, and the undulating portions having a curved shape that advances and retreats in the circumferential direction of the rotary shaft 100 are formed.

Furthermore, the one end portion 18a of the backup foil 18 is inserted into the corrugated groove portion 34 to be located on one side (side in the direction of the arrow b) inside the corrugated groove portion 34 with respect to the one side wall surface 34a and the one end portion 16a of the top foil 16. That is, the one end portion 18a of the backup foil 18 is inserted between the one side wall surface 34a and the one end portion 16a of the top foil 16. In addition, as in the embodiment illustrated in FIG. 1, the rotary shaft 100 (not illustrated) rotates to the other side (direction of the arrow c).

According to the present embodiment, the pair of side wall surfaces 34a and 34b forming the corrugated groove portion 34 have the undulating portion formed in the circumferential direction. Therefore, the one end portion 16a of the top foil 16 and the one end portion 18a of the backup foil 18 which are inserted into the corrugated groove portion 34 can be inserted into the corrugated groove portion 34 to repeatedly come into contact with a plurality of protrusion portions 36a and 36b formed on each of the side wall surfaces 34a and 34b as illustrated in FIG. 7. In this manner, the frictional force generated between the one end portion 16a of the top foil 16 and the one end portion 18a of the backup foil 18 and the side wall surfaces 34a and 34b can increase. Therefore, the movements of the top foil 16 and the backup foil 18 in the axial direction can be effectively prevented.

In one embodiment, the one end portion 16a of the top foil 16 and the one end portion 18a of the backup foil 18 may be inserted into the corrugated groove portion 34 by being bent to have a certain degree of the undulating portions to be insertable into the corrugated groove portion 34, or may be press-fitted into the corrugated groove portion 34 by using elasticity of the one end portion 16a of the top foil 16 and the one end portion 18a of the backup foil 18 while maintaining a linear shape. In the latter case, the one end portion 16a of the top foil 16 and the one end portion 18a of the backup foil 18 can be inserted into the corrugated groove portion 34 in a state of being press-welded to the protrusion portions 36a and 36b of the corrugated groove portion 34. Therefore, the frictional force generated between the one end portion 16a of the top foil 16 and the one end portion 18a of the backup foil 18 and the protrusion portions 36a and 36b can increase. Therefore, the top foil 16 and the backup foil 18 can be stably fixed to the corrugated groove portion 34.

In any insertion method described above, the one end portion 16a of the top foil 16 and the one end portion 18a of the backup foil 18 are in contact with only the protrusion portions 36a and 36b, and the entire surfaces are not in contact with the side wall surfaces 34a and 34b. Therefore, the one end portion 16a of the top foil 16 and the one end portion 18a of the backup foil 18 can be easily inserted into the corrugated groove portion 34, and it is not necessary to carry out precise work for the dimension between the side wall surface 34a and the side wall surface 34b in accordance with the plate thickness dimensions of the one end portion 16a of the top foil 16 and the one end portion 18a of the backup foil 18.

For example, a shape of the undulating portions formed on the pair of side wall surfaces 34a and 34b may be formed in a corrugated shape (for example, like the sine curve) having ridges and valleys in the circumferential direction, or may have the undulating portions having a rectangular shape. That is, the protrusion portions 36a and 36b may be formed in a flat surface, or may be formed in an arc shape like a parabola.

In the present embodiment, at least one of the one side wall surface 34a and the other side wall surface 34b of the corrugated groove portion 34 may be configured to have the surface roughness in which the arithmetic average roughness Ra is 3 to 50 μm (preferably, 5 to 30 μm).

In this manner, the arithmetic average roughness Ra of the other side wall surface 34b has the surface roughness of 3 μm to 50 μm. Therefore, the frictional force generated between the other side wall surface 34b and the one end portion 16a of the top foil 16 pressed against the other side wall surface 34b can further increase. Therefore, the movements of the top foil 16 and the backup foil 18 in the axial direction can be more reliably prevented.

Figure 8:
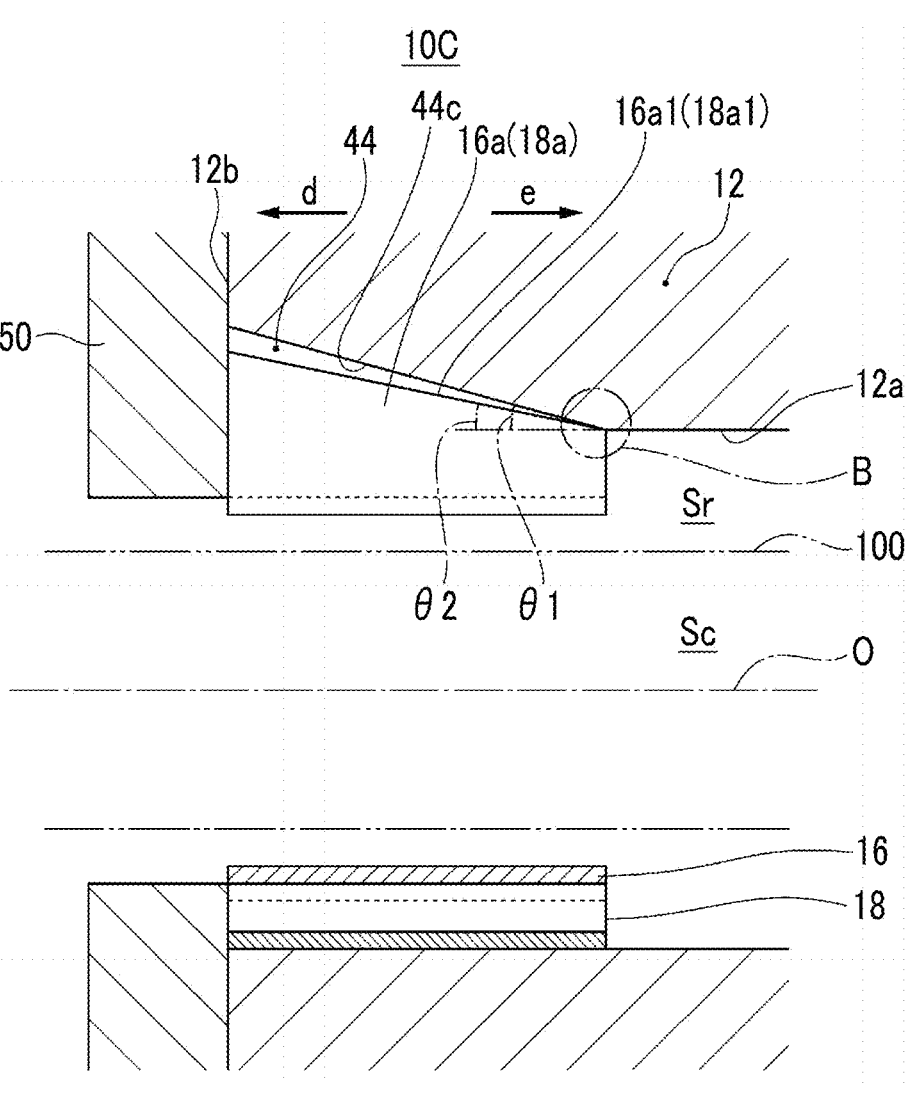
FIG. 8 is a side sectional view of a gas bearing device according to still another embodiment.

FIG. 8 is a front sectional view taken along the axial direction which illustrates a gas bearing device 10C according to still another embodiment.

As in the embodiment illustrated in FIGS. 1 to 7, in the gas bearing device 10C, the housing 12 is provided around the rotary shaft 100, and the annular gap Sr is formed between the rotary shaft 100 and the housing 12. The inner peripheral surface 12a of the housing 12 includes an inclined groove portion 44 in which a distance from the central axis O of the rotary shaft 100 decreases from one side toward the other side in the axial direction. A bottom surface 44c of the inclined groove portion 44 is inclined such that the distance from the central axis O decreases from one side in the axial direction toward the other side in the axial direction. The one end portion 16a of the top foil 16 and the one end portion 18a of the backup foil 18 are disposed in the inclined groove portion 44 such that each tip abuts on at least a portion of the bottom surface 44c of the inclined groove portion 44.

The top foil 16 is provided in the annular gap Sr to surround the rotary shaft 100, and the one end portion 16a of the top foil 16 in the circumferential direction of the rotary shaft 100 is: inserted into the inclined groove portion 44. The backup foil 18 is provided on an outer side of the top foil 16 in the radial direction to surround the top foil 16, and the backup foil 18 elastically supports the top foil 16. The one end portion 18a of the backup foil 18 in the circumferential direction is inserted into the inclined groove portion 44.

In FIG. 8, although the one end portion 18a of the backup foil 18 is not illustrated, the one end portion 18a is disposed in a hidden state while having the same height as that of the one end portion 16a on a back surface side of the one end portion 16a of the top foil 16. Therefore, in FIG. 8, the reference numerals 18a and 18a1 are illustrated in parentheses.

In addition, in FIG. 8, the "one side in the axial direction" refers to a direction in which the distance between the bottom surface 44c of the inclined groove portion 44 and the central axis O of the rotary shaft 100 gradually increases (direction of an arrow d in FIG. 8), and the "other side in the axial direction" refers to a direction in which the distance between the bottom surface 44c of the inclined groove portion 44 and the central axis O of the rotary shaft 100 gradually decreases (direction of an arrow e in FIG. 8).

According to the present embodiment, a tip 16a1 (outermost edge of the one end portion 16a in the radial direction) of the one end portion 16a of the top foil 16 inserted into the inclined groove portion 44 and a tip 18a1 (outermost edge of the one end portion 18a in the radial direction) of the one end portion 18a of the backup foil 18 abut on at least a portion of the bottom surface 44c of the inclined groove portion 44. Therefore, the frictional force is generated therebetween. The movements of the top foil 16 and the backup foil 18 in the axial direction are prevented by the frictional force, and the top foil 16 and the backup foil 18 are stably held by the inclined groove portion 44.

In the embodiment illustrated in FIG. 8, as in the inclined groove portion 44, the tip 16a1 and the tip 18a1 of each of the one end portion 16a of the top foil 16 and the one end portion 18a of the backup foil 18 are also inclined such that the distance from the central axis O decreases from the one side end surface 12b in the direction of the arrow e. On the other hand, in another embodiment, the tip 16a1 and the tip 18a1 of each of the one end portion 16a of the top foil 16 and the one end portion 18a of the backup foil 18 may be parallel to the axial direction with respect to the central axis O.

In addition, in the embodiment illustrated in FIG. 8, an inclination angle θ1 of the bottom surface 44c with respect to the central axis O and an inclination angle θ2 of the one end portion 16a of the top foil 16 and the one end portion 18a of the backup foil 18 with respect to the central axis O are in a relationship of θ2<θ1. The tip 16a1 and the tip 18a1 of the one end portions 16a and 18a abut on the bottom surface 44c of the inclined groove portion 44 in a region B (other side region in the axial direction) in FIG. 8.

On the other hand, in another embodiment, the relationship may be θ1=θ2. In a case of θ1=θ2, the tip 16a1 and the tip 18a1 of each of the one end portion 16a of the top foil 16 and the one end portion 18a of the backup foil 18 come into contact with the bottom surface 44c in the entire region in the axial direction of the one end portion 16a of the top foil 16 and the one end portion 18a of the backup foil 18. Therefore, the frictional force generated therebetween further increases. Therefore, the movements of the top foil 16 and the backup foil 18 in the axial direction can be reliably prevented.

In addition, in the embodiment illustrated in FIG. 8, the bottom surface 44c of the inclined groove portion 44 forms a flat surface having a linear shape along the axial direction. However, the bottom surface 44c may be a curved surface having a curved shape along the axial direction.

In addition, in the embodiment illustrated in FIG. 8, the bottom surface 44c of the inclined groove portion 44, the one end portion 16a of the top foil 16, and the one end portion 18a of the backup foil 18 are inclined such that the distance from the central axis O decreases from one side (left side in the drawing) toward the other side (right side in the drawing). However, all of these may be inclined such that the distance from the central axis O increases from one side (left side in the drawing) toward the other side (right side in the drawing).

In one embodiment, as illustrated in FIG. 8, a second housing 50 connected to one side of the housing 12 in the axial direction is further provided. The second housing 50 has a shape protruding toward the rotary shaft 100 side from the housing 12. Each of the one end portion 16a of the top foil 16 and the one end portion 18a of the backup foil 18 is disposed in the inclined groove portion 44 in a state where the pressing force is applied from one side to the other side in the axial direction by the second housing 50.

According to the present embodiment, the pressing force is applied to each of the one end portion 16a of the top foil 16 and the one end portion 18a of the backup foil 18 inserted into the inclined groove portion 44 from one side toward the other side in the axial direction by the second housing 50. Therefore, the movements of the top foil 16 and the backup foil 18 in the axial direction can be more reliably prevented.

In the above embodiment, the second housing 50 may be provided integrally with the housing 12, or may be provided separately from the housing 12.

In the embodiment illustrated in FIG. 8, the tip on the rotary shaft 100 side of the second housing 50 extends to the rotary shaft 100 side up to a position substantially equivalent to a tip portion on the rotary shaft 100 side of the backup foil 18. In this manner, the movements of the top foil 16 and the backup foil 18 in the axial direction can be reliably prevented.

Furthermore, in another embodiment, as in the inclined groove portion 44 of the gas bearing device 10C illustrated in FIG. 8, the corrugated groove portion 34 of the gas bearing device 10B illustrated in FIG. 7 is configured to have the bottom surface 44c inclined with respect to the central axis O of the rotary shaft 100 from one side toward the other side in the axial direction. The one end portion 16*a* of the top foil 16 and the one end portion 18*a* of the backup foil 18 which are inserted into the corrugated groove portion 34 are disposed in the inclined groove portion 44 such that the tips 16*a*1 and 18*a*1 abut on the bottom surface 44*c* of the inclined groove portion 44.

According to the present embodiment, the one end portion 16*a* of the top foil 16 and the one end portion 18*a* of the backup foil 18 come into contact with the protrusion portions 36*a* and 36*b* formed in the corrugated groove portion 34 to generate the frictional force, and to generate the frictional force between the tips 16*a*1 and 18*a*1 of each of the one end portion 16*a* of the top foil 16 and the one end portion 18*a* of the backup foil 18 and the inclined bottom surface 44*c*. Therefore, the frictional force generated between the tips 6*a*1 and 18*a*1 and the corrugated groove portion 34 synergistically increases. Therefore, the movements of the top foil 16 and the backup foil 18 in the axial direction can be more effectively prevented.

For example, contents described in each of the above-described embodiments are understood as follows.

1) According to an aspect, there is provided a gas bearing device including a housing (12) internally having an accommodation space (Sc) for accommodating a rotary shaft (100), a groove portion (14) extending along an axial direction of the rotary shaft (100) being formed on an inner peripheral surface (12*a*) defining the accommodation space (Sc) in the housing (12), a top foil (16) provided in an annular gap (Sc) formed between the inner peripheral surface (12*a*) and the rotary shaft (100), one end portion (16*a*) in a circumferential direction of the rotary shaft (100) being inserted into the groove portion (14), and a backup foil (18) provided in the annular gap (Sr) to surround the top foil (16) on an outer side of the top foil (16) and configured to elastically support the top foil (16), the backup foil (18) being inserted into the groove portion (14) such that one end portion (18*a*) in the circumferential direction is located on one side (direction of an arrow a) inside the groove portion (14) with respect to the one end portion (16*a*) of the top foil (16). The groove portion (14) includes a pair of side wall surfaces (14*a* and 14*b*) disposed to face each other, the pair of side wall surfaces (14*a* and 14*b*) including one side wall surface (14*a*) located on the one side (direction of an arrow b) in the groove portion (14), and the other side wall surface (14*b*) located on the other side (direction of an arrow c) in the groove portion (14). The gas bearing device further includes pressing force application means (20) disposed in the groove portion (14), and configured to press the one end portions (16*a* and 18*a*) of each of the top foil (16) and the backup foil (18) against the other side wall surface (14*b*).

According to this configuration, the pressing force application means (20) is provided. Therefore, the one end portions (16*a* and 18*a*) of the top foil (16) and the backup foil (18) which are inserted into the groove portion (14) are pressed against the other side wall surface (14*b*) in the pair of side wall surfaces (16*a* and 18*a*) by the pressing force application means (20). In this manner, a frictional force generated between the one end portions (16*a* and 18*a*) of the top foil (16) and the backup foil (18) and a frictional force generated between the one end portion (16*a*) of the top foil (16) and the other side wall surface (14*b*) increase. Therefore, movements of the top foil (16) and the backup foil (18) in the axial direction of the rotary shaft (100) can be prevented.

2) As the gas bearing device according to another aspect, in the gas bearing device described in 1), the pressing force application means (20) includes a spring member (20*a*) configured separately from the backup foil (18), the spring member (20*a*) being disposed along an extending direction of the groove portion (14).

According to this configuration, the pressing force application means (20) includes the spring member (20*a*). The spring member (20*a*) generates a spring force for pressing the one end portions (16*a* and 18*a*) of the top foil (16) and the backup foil (18) against the other side wall surface (14*b*). In this manner, the frictional force generated between the one end portions (16*a* and 18*a*) of the top foil (16) and the backup foil (18) and the frictional force generated between the one end portion (16*a*) of the top foil (16) and the other side wall surface (14*b*) can increase. Therefore, the movements of the top foil (16) and the backup foil (18) in the axial direction can be prevented by using simple means of disposing the spring member (20*a*) in the groove portion (14). In addition, the top foil (16) receives the pressing force of the spring member (20*a*) by directly coming into contact with the other side wall surface (14*b*). Therefore, a position of the one end portion (16*a*) of the top foil (16) is accurately held at a predetermined position without being affected by deformation of the spring member (20*a*).

3) As the gas bearing device according to still another aspect, in the gas bearing device described in 1), the pressing force application means (20) includes an extending portion (20*b*) formed integrally with the backup foil (18) in the one end portion (18*a*) of the backup foil (18), the extending portion (20*b*) extending from the other side (direction of an arrow c) toward the one side (direction of an arrow b) in the groove portion (14).

According to this configuration, the extending portion (20*b*) abuts on the one side wall surface (14*a*) in the pair of side wall surfaces (14*a* and 14*b*) to apply the pressing force to the one side wall surface (14*a*). Therefore, the extending portion (20*b*) conversely receives a reaction force from the other side wall surface (14*b*). The reaction force can generate the pressing force of pressing the one end portions (16*a* and 18*a*) of the top foil (16) and the backup foil (18) against the other side wall surface (14*b*). In this manner, the frictional force generated between the one end portions (16*a* and 18*a*) of the top foil (16) and the backup foil (18) and the frictional force generated between the one end portion (16*a*) of the top foil (16) and the other side wall surface (14*b*) can increase. Therefore, the movements of the top foil (16) and the backup foil (18) in the axial direction can be prevented by using the simple means of forming the extending portion (20*b*) in the backup foil (18).

4) As the gas bearing device according to still another aspect, in the gas bearing device described in any one of 1) to 3), the other side wall surface (14*b*) has an arithmetic average roughness Ra of 3 μm or greater and 50 μm or smaller.

According to this configuration, the other side wall surface (14*b*) has the surface roughness in which the arithmetic average roughness Ra is 3 μm or greater and 50 μm or smaller. Therefore, the frictional force generated between the one end portion (16*a*) of the top foil (16) pressed against the other side wall surface (14*b*) by the pressing force application means (20) and the other side wall surface (14*b*) can further increase. In this manner, the movement of the top foil (16) in the axial direction can be effectively prevented.

5) According to still another aspect, there is provided a gas bearing device including a housing (12) internally having an accommodation space (Sc) for accommodating a rotary shaft (100), a groove portion (14) extending along an axial direction of the rotary shaft (100) being formed on an inner peripheral surface (12*a*) defining the accommodation space (Sc) in the housing (12), a top foil (16) provided in an annular gap (Sr) formed between the inner peripheral surface (12*a*) and the rotary shaft (100), one end portion (16*a*) in a circumferential direction of the rotary shaft (100) being inserted into the groove portion (14), and a backup foil (18) provided in the annular gap (Sr) to surround the top foil (16) on an outer side of the top foil (16) and configured to elastically support the top foil (16), the backup foil (18) being inserted into the groove portion (14) such that the one end portion (18*a*) in the circumferential direction is located on one side (direction of an arrow b) inside the groove portion (14) with respect to the one end portion (16*a*) of the top foil (16). The groove portion (14) includes a corrugated groove portion (34) extending in a corrugated shape along the axial direction.

According to this configuration, the groove portion (14) includes the corrugated groove portion (34) extending in a corrugated shape along the axial direction. Therefore, the one end portions (16*a* and 18*a*) of the top foil (16) and the backup foil (18) which are inserted into the corrugated groove portion (34) can be disposed inside the corrugated groove portion (34) in a state of being in contact with the plurality of protrusion portions (36*a* and 36*b*) formed on the pair of side wall surfaces (34*a* and 34*b*) of the corrugated groove portion (34). In this manner, the frictional force generated between the one end portions (16*a* and 18*a*) and the corrugated groove portion (34) can increase. Therefore, the movements of the top foil (16) and the backup (18) in the axial direction can be prevented.

6) As the gas bearing device according to still another aspect, in the gas bearing device described in 5), the corrugated groove portion (34) includes a pair of side wall surfaces (34*a* and 34*b*) disposed to face each other, the pair of side wall surfaces (34*a* and 34*b*) including one side wall surface (34*a*) located on the one side (direction of an arrow b) in the groove portion (34), and the other side wall surface (34*b*) located on the other side (direction of an arrow c) in the groove portion (34). At least one of the one side wall surface (34*a*) and the other side wall surface (34*b*) has an arithmetic average roughness Ra of 3 μm or greater and 50 μm or smaller.

According to this configuration, the other side wall surface (34*b*) in the pair of side wall surfaces (34*a* and 34*b*) forming the corrugated groove portion (34) has the surface roughness in which the arithmetic average roughness Ra is 3 μm or greater and 50 μm or smaller. Therefore, the frictional force generated between the one end portion (16*a*) of the top foil (16) pressed against the other side wall surface (34*b*) by the pressing force application means (20) and the other side wall surface (34*b*) can further increase. Therefore, the movement of the top foil (16) in the axial direction can be more effectively prevented.

7) As the gas bearing device according to still another aspect, in the gas bearing device described in 5) or 6), the groove portion (14) includes an inclined groove portion (44) in which a distance from a center line (O) of the rotary shaft (100) decreases from one side (direction of an arrow d) toward the other side (direction of an arrow e) in the axial direction. The one end portions (16*a* and 18*a*) of each of the top foil (16) and the backup foil (18) are disposed in the inclined groove portion (44) such that each of tips (16*a*1 and 18*a*1) of the one end portions (16*a* and 18*a*) abuts on a bottom surface (44*c*) of the inclined groove portion (44).

According to this configuration, in the inclined groove portion (44), the tips (16*a*1 and 18*a*1) of each of the one end portions (16*a* and 18*a*) of the top foil (16) and the backup foil (18) which are inserted into the inclined groove portion (44) abut on the bottom surface (44*c*) of the inclined groove portion (44). Therefore, the frictional force is generated therebetween. Therefore, in addition to the frictional force generated between the one end portions (16*a* and 18*a*) of the top foil (16) and the backup foil (18) and the pair of side wall surfaces of the corrugated groove portion (44), the frictional force can also be generated between the one end portions (16*a* and 18*a*) of the top foil (16) and the backup foil (18) and the inclined bottom surfaces (44*c*) forming the corrugated groove portion (44). In this manner, the frictional force generated between the one end portions (16*a* and 18*a*) of the top foil (16) and the backup foil (18) and the corrugated groove portion (34) synergistically increases. Therefore, the movements of the top foil (16) and the backup foil (18) in the axial direction can be more effectively prevented.

8) According to still another aspect, there is provided a gas bearing device including a housing (12) internally having an accommodation space (Sc) for accommodating a rotary shaft (100), a groove portion (14) extending along an axial direction of the rotary shaft (100) being formed on an inner peripheral surface (12*a*) defining the accommodation space (Sc) in the housing (12), a top foil (16) provided in an annular gap (Sr) formed between the inner peripheral surface (12*a*) and the rotary shaft (100), one end portion (16*a*) in a circumferential direction of the rotary shaft (100) being inserted into the groove portion (14), and a backup foil (18) provided in the annular gap (Sr) to surround the top foil (16) on an outer side of the top foil (16) and configured to elastically support the top foil (16), one end portion (18*a*) in the circumferential direction being inserted into the groove portion (14) to be located on one side (direction of an arrow b) inside the groove portion (14) with respect to the one end portion (16*a*) of the top foil (16). The groove portion (14) includes an inclined groove portion (44) in which a distance from a center line (O) of the rotary shaft (100) decreases from one side (direction of an arrow d) toward the other side (direction of an arrow e) in the axial direction. The one end portions (16*a* and 18*a*) of each of the top foil (16) and the backup foil (18) are disposed in the inclined groove portion (44) such that each of tips (16*a*1 and 18*a*1) of each of the one end portions (16*a* and 18*a*) abuts on a bottom surface (44*c*) of the inclined groove portion (44).

According to this configuration, in the inclined groove portion (44), the tips (16*a* and 18*a*) of each of the one end portions (16*a*1 and 18*a*1) of the top foil (16) and the backup foil (18) and the bottom surface (44*c*) of the inclined groove portion (44) abut on each other. Therefore, the frictional force is generated therebetween. The movements of the top foil (16) and the backup foil (18) in the axial direction can be prevented by the frictional force.

9) As the gas bearing device according to still another aspect, the gas bearing device described in 8) further includes a second housing (50) connected to the housing (12) on one side (direction of an arrow d) in the axial direction. The one end portions (16*a* and 18*a*) of each of the top foil (16) and the backup foil (18) are disposed in the inclined groove portion (44) in a state where a pressing force is applied from the one side (direction of an arrow d) toward the other side (direction of an arrow e) in the axial direction by the second housing (50).

According to this configuration, the pressing force is applied to the one end portions (16*a* and 18*a*) of each of the top foil (16) and the backup foil (18) which are inserted into the inclined groove portion (44) from the one side (direction of the arrow d) toward the other side (direction of the arrow e) in the axial direction by the second housing (50). Therefore, the movements of the top foil (16) and the backup foil (18) in the axial direction can be reliably prevented.

REFERENCE SIGNS LIST

10A, 10B, 10C: Gas bearing device
12: Housing
12*a*: Inner peripheral surface
12*b*: One side end surface
12*c*: Other side wall surface
14: Groove portion
14*a*: One side wall surface (pair of side wall surfaces)
14*b*: Other side wall surface (pair of side wall surfaces)
14*c*: Bottom surface
16: Top foil
16*a*: One end portion
16*a*1: Tip
16*b*: Other end portion
18: Backup foil
18*a*: One end portion
18*a*1: Tip
18*b*: Other end portion
19*a*: Ridge portion
19*b*: Valley portion
20: Pressing force application means
20*a*: Spring member
22: Torsion coil spring
22*a*, 22*b*: Linear portion
20*b*: Extending portion
24*a*: First extending portion
24*b*: Second extending portion
26: Coil spring
34: Corrugated groove portion
34*a*: One side wall surface (pair of side wall surfaces)
34*b*: Other side wall surface (pair of side wall surfaces)
36*a*, 36*b*: Protrusion portion
44: Inclined groove portion
44*c*: Bottom surface
50: Second housing
100: Rotary shaft
AL: Axis
O: Central axis
Sc: Accommodation space
Sr: Annular gap
θ1, θ2: Inclination angle

The invention claimed is:

1. A gas bearing device comprising:
a housing internally having an accommodation space for accommodating a rotary shaft, a groove portion extending along an axial direction of the rotary shaft being formed on an inner peripheral surface defining the accommodation space in the housing;
a top foil provided in an annular gap formed between the inner peripheral surface and the rotary shaft, one end portion in a circumferential direction of the rotary shaft being inserted into the groove portion; and a backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil,
wherein the groove portion includes a pair of side wall surfaces disposed to face each other, the pair of side wall surfaces including
one side wall surface located on the one side in the groove portion,
the other side wall surface located on the other side in the groove portion, and
the gas bearing device further comprises pressing force application means disposed in the groove portion, and configured to press the one end portion of each of the top foil and the backup foil against the other side wall surface,
wherein the pressing force application means includes a spring member configured separately from the backup foil, the spring member being disposed along an extending direction of the groove portion, and
wherein the spring member is a torsion coil spring formed by bending one rod member into a coil shape, the torsion coil spring having a one-side linear portion extending along the one side wall surface at one end portion of the rod member and the other-side linear portion extending along the other side wall surface at the other end portion of the rod member.

2. The gas bearing device according to claim 1,
wherein the other side wall surface has an arithmetic average roughness Ra of 3 μm or greater and 50 μm or smaller.

3. A gas bearing device comprising:
a housing internally having an accommodation space for accommodating a rotary shaft, a groove portion extending along an axial direction of the rotary shaft being formed on an inner peripheral surface defining the accommodation space in the housing;
a top foil provided in an annular gap formed between the inner peripheral surface and the rotary shaft, one end portion in a circumferential direction of the rotary shaft being inserted into the groove portion; and
a backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil,
wherein the groove portion includes a pair of side wall surfaces disposed to face each other, the pair of side wall surfaces including
one side wall surface located on the one side in the groove portion, and
the other side wall surface located on the other side in the groove portion,
the gas bearing device further comprises pressing force application means disposed
in the groove portion, and configured to press the one end portion of each of the top foil and the backup foil against the other side wall surface, and
wherein the pressing force application means includes an extending portion formed integrally with the backup foil in the one end portion of the backup foil, the extending portion extending from the other side toward the one side in the groove portion.

4. A gas bearing device comprising:

a housing internally having an accommodation space for accommodating a rotary shaft, a groove portion extending along an axial direction of the rotary shaft being formed on an inner peripheral surface defining the accommodation space in the housing;

a top foil provided in an annular gap formed between the inner peripheral surface and the rotary shaft, one end portion in a circumferential direction of the rotary shaft being inserted into the groove portion; and a backup foil provided in the annular gap to surround the top foil on an outer side of the top foil and configured to elastically support the top foil, the backup foil being inserted into the groove portion such that the one end portion in the circumferential direction is located on one side in the groove portion with respect to one end portion of the top foil, wherein the groove portion includes an inclined groove portion in which a distance from a center line of the rotary shaft decreases from one side toward the other side in the axial direction, and the one end portion of each of the top foil and the backup foil is disposed in the inclined groove portion such that a tip of each of the one end portions abuts on a bottom surface of the inclined groove portion.

5. The gas bearing device according to claim 4, further comprising:

a second housing connected to the housing on one side in the axial direction, wherein the one end portion of each of the top foil and the backup foil is disposed in the inclined groove portion in a state where a pressing force is applied from the one side toward the other side in the axial direction by the second housing.

* * * * *